United States Patent Office 2,901,908
Patented Sept. 1, 1959

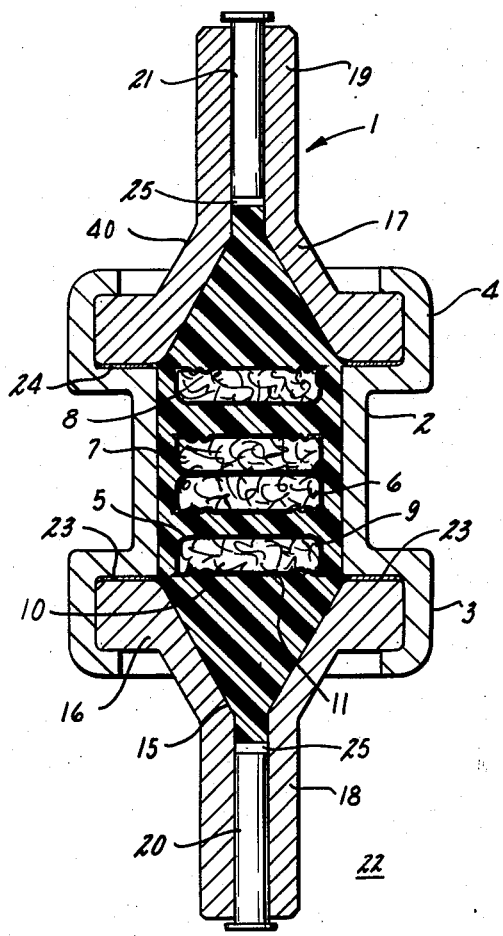
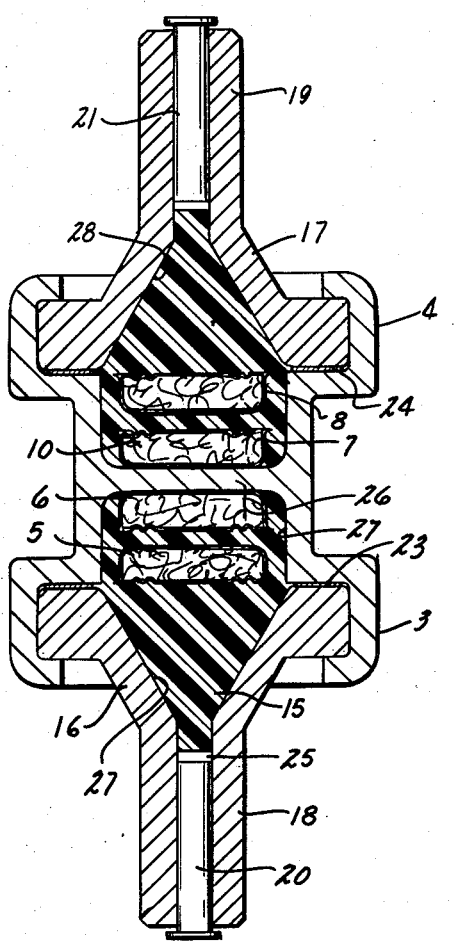
INVENTORS
GEORGE ASAKAWA
BY SERGIUS VERNET
SMITH, OLSEN & KOTTS
ATTORNEYS

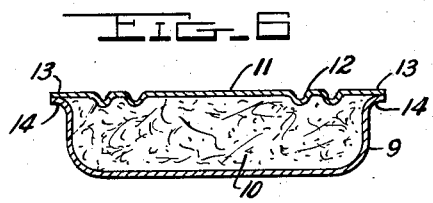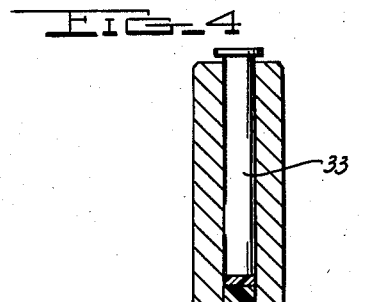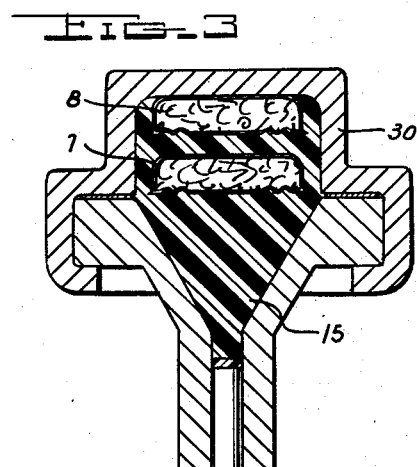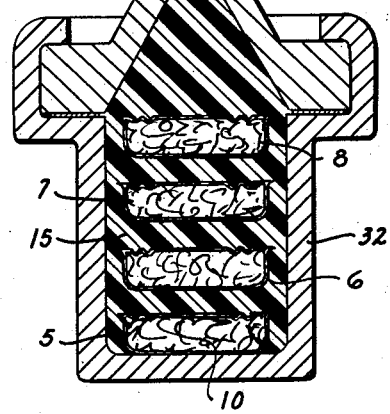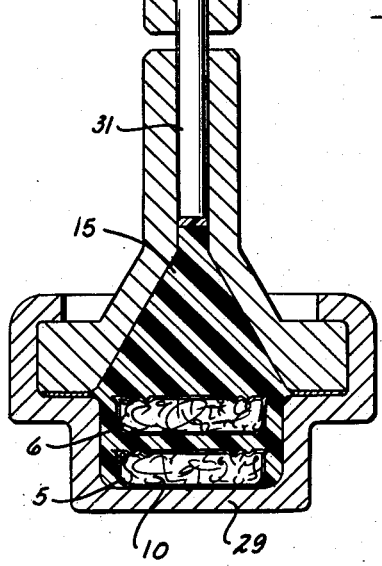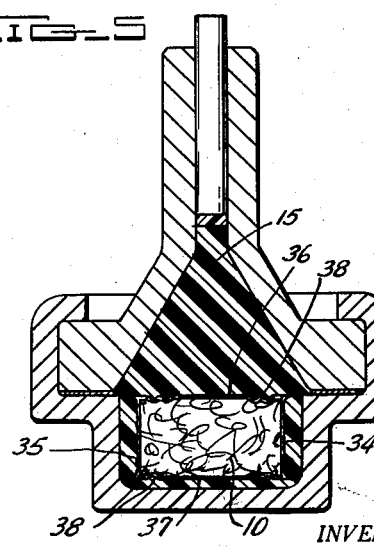

2,901,908

THERMOSTATIC ELEMENTS

George Asakawa and Sergius Vernet, Yellow Springs, Ohio, assignors to Antioch College, Yellow Springs, Ohio, a corporation of Ohio Application June 6, 1955, Serial No. 513,455

6 Claims. (Cl. 73—368.3)

This invention relates to thermostatic elements wherein there is employed a material responsive on temperature increase to expand and on temperature decrease to contract.

In co-pending application Serial No. 510,708, filed on May 24, 1955, there is disclosed a thermostatic element of the above identified type. In said application there is employed a cup-like vessel of heat conducting material. A thin-walled envelope is seated within said vessel and is provided with a corrugated wall extending across the mouth of the vessel. A body of thermally expansible material is positioned within the envelope, and overlying the envelope is a cover-like housing provided with a sealing bore and a guide bore. A body of force-transmitting and sealing material is positioned within the sealing bore, and a spring-urged piston is slidably positioned in the guide bore.

Operation of the thermostatic element is such that on temperature increase in the ambient atmosphere surrounding said element the thermally expansible material expands and causes the corrugated wall to flex outwardly. This outward flexing of the corrugated wall results in a movement of the force-transmitting material into the guide bore and a corresponding movement of the piston outwardly of the guide bore against the action of its spring. On temperature decrease of the ambient atmosphere the thermally expansible material contracts and allows the spring to move the piston inwardly into the guide bore. In practice the piston is operatively connected with a valve or other mechanism, whereby to actuate said mechanism in response to temperature changes in the ambient atmosphere.

The corrugated envelope wall is constructed with relatively thin or "low amplitude" corrugations in order that it may maintain a high resistance to rupture-producing forces. As a result the corrugated wall is capable of only limited flexural movements with correspondingly limited piston movements. Such limited piston movements are in many cases undesirable, and in such cases relatively expensive linkage and lever mechanisms must be employed to multiply the piston movements.

The present invention proposes a construction which includes an envelope having a corrugated wall as in application Serial No. 510,708, but in the present invention relatively high piston movements are obtained, and without employing any linkage and lever mechanisms.

In one embodiment of the invention there is employed an envelope having two corrugated walls. The corrugations are relatively thin as in application Serial No. 510,708 but since there are provided two corrugated walls instead of one the size of envelope and volume of thermally expansible material can be made sufficiently great to produce a relatively high piston travel. In order to provide for flexure of both corrugated walls the envelope is completely enclosed in a body of force-transmitting material. In effect the envelope floats in the body of force-transmitting material.

In other embodiments of the invention there are provided a plurality of envelopes within a body of force-transmitting material. One or more of the envelope walls are corrugated to accommodate expansive movement of the thermally expansible material. High piston travels are obtained, due to the fact that a plurality of envelopes are employed instead of one as in application Serial No. 510,708.

One object of the present invention is to provide a thermostatic element of the type wherein there is employed a body of thermally expansible material operating in an envelope having a corrugated wall and wherein a relatively large piston travel is permitted without rupture of the corrugated wall.

Another object is to provide a thermostat wherein there is employed a body of thermally expansible material operating in an envelope having a corrugated wall and wherein the movement of the corrugated wall is relatively small so as to prevent distortion and rupture thereof.

Another object of the present invention is to provide a thermostat wherein there is employed a body of thermally expansible material operating in an envelope having a corrugated wall and wherein the piston travel per flexure of the corrugated wall is at a maximum, thereby providing a construction having maximum piston travel and minimum tendency for envelope rupture.

Another object of the present invention is to provide a thermostat wherein there is employed a plurality of envelopes each of which encloses a body of thermally expansible material and each of which is provided with a corrugated wall whereby to give maximum piston travel per corrugated wall movement.

Other objects of this invention will appear in the following description and appended claims, reference being had to the accompanying drawings forming a part of this specification wherein like reference characters designate corresponding parts in the several views.

In the drawings:

Figure 1 is a cross sectional view taken through one embodiment of the invention.

Figure 2 is a cross sectional view taken through a second embodiment of the invention.

Figure 3 is a cross sectional view taken through another embodiment of the invention.

Figure 4 is a cross sectional view taken through still another embodiment of the invention.

Figure 5 is a sectional view of still another embodiment of the invention, and

Figure 6 is an enlarged sectional view of an envelope construction employed in the Figures 1–5 embodiments.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings and particularly in Figure 1, there is shown a thermostatic element 1 comprised of a cylindrical casing 2 having rim portions 3 and 4 at each of its ends. Within casing 2 there are provided a plurality of similarly formed envelopes 5, 6, 7 and 8. Since these envelopes are of similar construction a description of one will suffice for a description of all. Envelope 5 includes a cylindrical dish-shaped housing 9 formed of metallic material, preferably stainless steel. Disposed within housing 9 is a body of thermally expansible material 10. Preferably material 10 is the same as that disclosed in co-pending application, Serial Number 597,293 filed on July 11, 1956. Overlying the mouth of housing 9 and sealing material 10 within said housing is a circular wall 11. Wall 11 is provided with a plurality of thin or "low amplitude" ring-like corrugations 12, and the peripheral edge 13 of wall 11 is welded to a peripheral flange 14 extending from housing 9.

Surrounding envelopes 5, 6, 7 and 8 is a body of force-transmitting material 15. This material is preferably the same as that disclosed in co-pending application Serial No. 498,655, filed on April 1, 1955. Body 15 is retained within a vessel 40 defined by casing 2 and cover-like housings 16 and 17. Gaskets 23 and 24 are provided for sealing the joints between casing 2 and housings 16 and 17. Housings 16 and 17 include two sleeve-forming extensions 18 and 19, and slidably received within these extensions are two pistons 20 and 21. These pistons may be considered as movable walls of vessel 40. One or more springs (not shown) are provided for forcing pistons 20 and 21 toward each other in opposition to the expansive action of the temperature responsive material in envelopes 5, 6, 7 and 8.

Between each of pistons 20, 21 and material 15 are anti-chafing discs 25. These discs prevent any of material 15 from being squeezed in the joint between the pistons and sleeves 18, 19 and carried away so as to cause the element to lose its calibration.

In practice, thermostatic element 1 is positioned within an atmosphere 22 of temperature changing characteristics. Temperature increase of atmosphere 22 causes material 10 to expand and force each of walls 11 to a position wherein corrugations 12 are, to a certain extent, flattened out from their illustrated positions. During this expansive movement of material 10, force-transmitting material 15 will be pushed outwardly into sleeves 18 and 19, whereby to cause pistons 20 and 21 to travel outwardly in said sleeves.

There are employed four envelopes and for any given piston movement, there is accordingly a relatively small expansive movement of each wall 11. This small movement is advantageous in that corrugations 12 undergo relatively small amounts of flexing during the flattening out process and the respective ones of walls 11 are thereby subjected to very small rupture producing forces. However, due to the fact that a plurality of envelopes are employed the total expansible movement of material 10 and the total travel of pistons 20 and 21 are relatively high. As stated previously high piston travels are desirable in that they eliminate the need for the linkage and lever mechanisms sometimes employed for multiplying piston movements.

The embodiments of the invention shown in Figures 2 through 5 employ similar mechanisms as that employed in the Figure 1 embodiment and, accordingly, similar reference numerals are applied to similar parts.

The Figure 2 embodiment is structurally similar to the Fig. 1 embodiment except that casing 2 is provided with a partition 26. This partition cooperates with housing 16 to form a chamber 27, and with housing 17 to form a chamber 28. Envelopes 5 and 6 may be filled with a different thermally expansible material than envelopes 7 and 8, and pistons 20 and 21 may each be operatively connected to a separate valve (not shown). The arrangement of parts is such that piston 20 may actuate its valve at one temperature or range of temperatures and piston 21 may actuate its valve at a second temperature or range of temperatures. The term "range of temperatures" is used in the same sense as in co-pending application Serial No. 597,293.

The Figure 3 embodiment employs a plurality of casings 29, 30 and a single piston 31. As in the Figure 2 embodiment envelopes 5 and 6 may be filled with a different thermally expansible material than envelopes 7 and 8. Casing 29 may be positioned in one atmosphere and casing 30 may be positioned in a different atmosphere so as to render the thermostatic element responsive to two different temperatures or ranges of temperatures.

The Figure 4 embodiment employs a single casing 32 and a single piston 33. Operation of the Figure 4 embodiment is similar to that of the Figure 1 embodiment except that the Figure 1 embodiment may feasibly be employed to actuate two mechanisms (one mechanism with each piston) whereas the Figure 4 embodiment may feasibly be employed to actuate but one mechanism.

With each of the Figure 1 through Figure 4 mechanisms there are employed a plurality of envelopes 5, 6, 7 and 8, each of which is provided with one corrugated wall 11. In the Figure 5 embodiment only one envelope 34 is employed. Envelope 34 includes a cylindrical wall 35 and two circular end walls 36 and 37, each of which is provided with a plurality of thin ring-like corrugations 38. A body of thermally expansible material 10 is disposed within envelope 34. Due to the fact that envelope 34 is provided with two corrugated walls instead of one it is possible to increase the envelope volume and reduce the number of envelopes. Envelope 34 has an expansible movement equivalent to the combined movements of any two of the envelopes in the Figure 1 through Figure 4 embodiments, and it is possible to substitute envelope 34 for any two of envelopes 5, 6, 7 and 8 without decreasing the piston travel.

We claim:

1. A thermostatic element comprising a housing structure defining an interior chamber, an outwardly tapering cavity extending from one end of the chamber, and a cylindrical guide bore extending outwardly from the smaller end of the tapering cavity; a piston slidably positioned in the guide bore; at least one sealed envelope within the chamber, said envelope comprising a metal cup-shaped element and a corrugated metal wall extending across the mouth of the cup-shaped element; thermally expansible material within said envelope; and force-transmitting material within the cavity and chamber surrounding the envelope.

2. The combination of claim 1 wherein the side wall of the cup-shaped element is formed with an outwardly extending peripheral flange at the mouth of the element and the corrugated wall extends into facial engagement with said flange, said corrugated wall being welded onto said flange, and said cup-shaped element being of one-piece construction.

3. The combination of claim 1 wherein a plurality of envelopes are provided within the chamber with the corrugated walls of the envelopes unconnected and spaced apart.

4. The combination of claim 3 wherein the thermally expansible material in one envelope undergoes its expansion at a different temperature than the thermally expansible material in another envelope.

5. The combination of claim 1 wherein the force-transmitting material is a solid, pliable, flowable material.

6. A thermostatic element comprising a housing structure defining an interior chamber, an outwardly tapering cavity extending from one end of the chamber, and a cylindrical guide bore extending outwardly from the smaller end of the tapering cavity; a piston slidably positioned in the guide bore; at least one sealed envelope within the chamber, said envelope comprising a metal cylinder and corrugated metal walls extending across the opposite ends thereof; thermally expansible material within said envelope; and force-transmitting material within the cavity and chamber surrounding the envelope.

References Cited in the file of this patent

UNITED STATES PATENTS

| 1,736,984 | Sheats | Nov. 26, 1929 |
| 2,128,274 | Vernet | Aug. 30, 1938 |
| 2,396,138 | Vernet | Mar. 5, 1946 |
| 2,481,096 | Fentress | Sept. 6, 1949 |
| 2,487,946 | Senn | Nov. 15, 1949 |

FOREIGN PATENTS

| 213,207 | Great Britain | Mar. 27, 1924 |
| 244,783 | Great Britain | June 24, 1926 |
| 702,868 | France | Jan. 27, 1931 |
| 621,261 | Great Britain | Apr. 6, 1949 |